Oct. 24, 1950     E. G. JUDD     2,527,257
PROCESS OF SEPARATING TITANIUM FROM ITS ORES
Filed Sept. 1, 1948
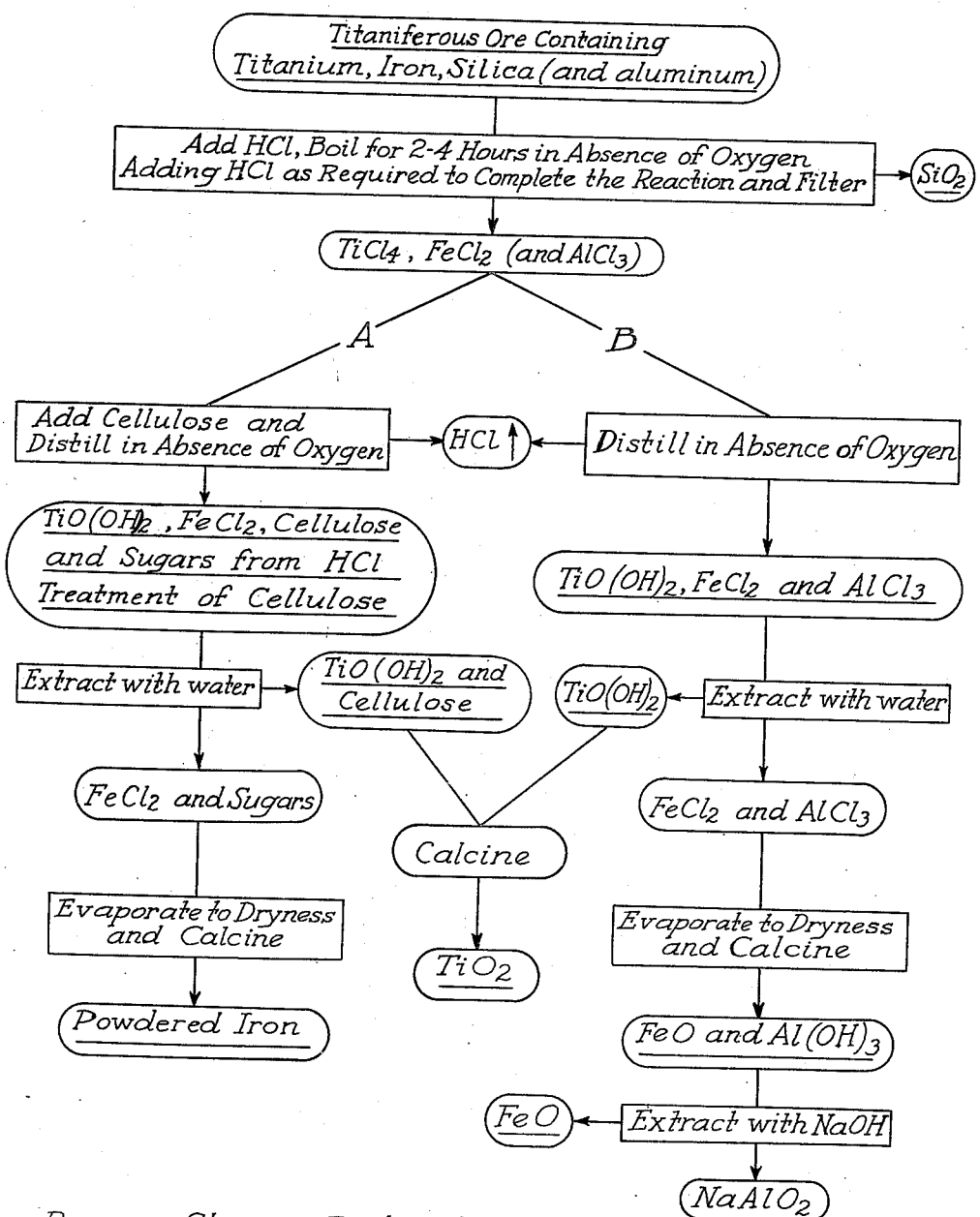
Inventor
Edwin G. Judd Patented Oct. 24, 1950

2,527,257

UNITED STATES PATENT OFFICE 2,527,257

PROCESS OF SEPARATING TITANIUM FROM ITS ORES

Edwin G. Judd, Vancouver, Wash.

Application September 1, 1948, Serial No. 47,175

12 Claims. (Cl. 75—114)

The present invention relates to a process for extracting titanium iron and aluminum from minerals containing these metals, the present application being a continuation-in-part of my application Serial Number 645,239 filed February 2, 1946, now abandoned, for Mineral Extraction Process.

As is well known, there are vast deposits of low grade titaniferous minerals containing titanium associated with various other metals, particularly iron and aluminum. Illustrative of such minerals are the titaniferous bauxites, titaniferous magnetite ("Black Sand"), and various of the ilmenites. These contain relatively low percentages of titanium, i. e. percentages of up to about 15% by weight titanium expressed as titanium dioxide. They have not been developed extensively as sources of titanium or of any of the metals which they contain because of their great resistance to the action of chemical agents normally used in decomposing minerals, i. e. in "opening them up," and also because of the difficulty in separating the titanium and the iron, once the mineral has been decomposed, neither of these two metals being particularly desirable commercially when contaminated with the other.

It is a primary purpose of the present invention to provide a rapid and efficient process for opening up titaniferous minerals containing up to about 15% by weight titanium calculated as titanium dioxide, the action being completed in from two to four hours as opposed to a period of several days taught by prior art processes.

It is another primary object of the present invention to provide a simple, effective, and practical process for quantitatively separating from each other the iron and titanium content of titaniferous iron ores.

Still a further object of the present invention is the provision of a process for opening up and separating titaniferous ores which process is adaptable to continuous operation.

It is another object of the present invention to provide a process for separating the various constituents of titaniferous ores from each other and for recovering them in useful and commercially valuable form.

Still a further object of the present invention is the provision of a process for opening up and separating titaniferous ores, which is applicable to low-grade minerals containing substantial quantities of silica and other materials.

Generally stated, the process of the present invention comprises opening up titaniferous, silica-containing iron ores which contain less than about 15% by weight titanium (as $TiO_2$) and which may also contain variable quantities of alumina by mixing the ore with concentrated hydrochloric acid, digesting the resulting mixture in the absence of oxygen for from two to four hours at the boiling point of the mixture but below the precipitation temperature of meta titanic acid, and separating the insoluble silica from the resulting solution containing titanium chloride, ferrous chloride, and aluminum chloride. The latter solution then is distilled in the absence of oxygen until the meta titanic acid is completely precipitated, it being necessary to remove substantially all the liquid content of the solution to accomplish this. The resulting moist salts, i. e. the meta titanic acid, the ferrous chloride, and the aluminum chloride then are extracted with water, which removes the soluble ferrous chloride and aluminum chloride from the insoluble meta titanic acid. The aqueous extract containing ferrous chloride and aluminum chloride then is processed for recovery of its metal content by suitable procedures.

Cellulosic materials, such as cotton, wood fiber, or pulp may be added to the acid mixture after digestion of the mineral and removal of the silica. This serves a two-fold purpose. In the first place, it keeps the meta titanic acid in suspension during the distillation step and prevents its adherence to the bottom and walls of the distillation apparatus. In the second place, it is in part converted to sugars by the action of the acid. These being soluble in water are separated together with the ferrous chloride during the subsequent processing operations. Then upon evaporation and calcination of the sugar containing solutions, the sugars act as reducing agents to reduce the iron chloride to powdered iron, a valuable commercial product.

The process of the present invention now will be described in greater detail and with particular reference to the flow plan comprising the single figure of the drawings and divided into two sections, the process of flow A being adapted to the treating of minerals containing titanium and iron, and the process of flow B being adapted for treating minerals containing aluminum in addition to titanium and iron.

As indicated above, the process of the invention is applicable to numerous, low grade titaniferous ores such as titaniferous magnetite, titaniferous bauxite, the various ilmenites, clays, and other acid soluble aluminum silicates. These contain relatively low percentages of titanium, i. e. percentages of less than about 15% titanium calculated as titanium dioxide. Typical of suitable minerals are the titaniferous bauxites having an average titanium content of about 4% (as TiO2) and containing also iron, aluminum and silica. Also typical are the "Black Sands" or titaniferous magnetites found along the Columbia and Lewis Rivers in the States Oregon and Washington and containing from about 33–44% iron and about 6–14% titanium dioxide together with variable amounts of silica, garnet, zircon, rutile, biotite and olivine.

Although the combinations of the various constituents of these minerals with each other is variable and in some cases indefinite, their chemical behavior is the same as if they were to contain ilmenite (FeTiO3), ferrous oxide (FeO), ferric oxide (Fe2O3), magnetite (Fe3O4), silica (SiO2) and hydrated aluminum oxide (Al2O3.2H2O)

and in the following discussion they will be considered as containing these constituents.

If necessary, the mineral first is subjected to preliminary drying, crushing, screening, and concentrating procedures. It then is mixed with concentrated hydrochloric acid, the amount and manner of mixing being variable depending in part upon the character of the mineral. With some minerals, as with the titaniferous bauxites, it is preferable to add part only of the concentrated hydrochloric acid in the first instance. Thus there may be added to these minerals from about one to about five parts acid for each part by weight of mineral, the remaining acid required for complete reaction with the mineral being added during the course of the digestion. With other minerals, as with the black sands, it may be preferable to add at the beginning of the reaction the entire amount of concentrated hydrochloric acid which theoretically is necessary to react with the mineral completely.

The hydrochloric acid should be sufficiently concentrated so that it readily attacks the titaniferous mineral at its boiling temperature. Commercial hydrochloric acids having specific gravities of from 1.14 to 1.19 are suitable. It is preferred with many minerals to use the ordinary, commercial concentrated acid containing upwards of 35%, preferably about 39% by weight hydrogen chloride and having a specific gravity of above about 1.19. It will be understood, of course, that, in place of the commercial hydrochloric acids, there may be used gaseous hydrogen chloride and water in amounts sufficient to form within the reaction mixture hydrochloric acid of the specified concentrations.

The mixture of titanium containing mineral and hydrochloric acid is placed in an air-tight reaction vessel, preferably equipped with a reflux or distillation condenser, and heated until the boiling temperature of the mixture is reached. It is preferred to apply the heat gradually, since, by so doing, time is allowed for reaction of the acid with the mineral so that the boiling temperature may be attained with little if any loss of acid from the reaction mixture.

As the reaction between the hydrochloric acid and the titaniferous mineral progresses, the titanium content of the latter is gradually converted to titanium chloride (TiCl4), and the aluminum content to aluminum chloride (AlCl3), the silica content being substantially unaffected. Since the digestion is effected in an air tight container in the absence of free oxygen, the iron content of the mixture will be reduced by the hydrochloric acid to the ferrous state, so that in the digestion mixture all iron salts will be in the form of ferrous chloride (FeCl2). This feature is of considerable importance in the practical operation of the process of the invention, since if ferric iron salts are present in the reaction mixture, they later will combine with the titanium to form ferric meta-titanate, which separates with and contaminates the titanium.

In continuing the digestion, advantage is taken of the discovery that, although meta titanic acid (TiO(OH)2) may be precipitated by heating solutions of titanium chloride, the temperature at which such precipitation occurs in hydrochloric acid solution is inversely proportional to the amount of titanium present. In other words, the lower the concentration of titanium chloride, the higher is the temperature required to precipitate the meta titanic acid. It thus is possible, contrary to the teachings of the prior art, to digest titaniferous ores containing less than 15% titanium (as titanium dioxide) at boiling temperatures until the minerals are completely opened. The temperature then may be increased to a level at which the meta titanic acid precipitates in order to effect the separation of the latter.

The digesion therefore may be continued at the boiling point of the solution without precipitating meta titanic acid until the titanium, iron and aluminum content of the mineral is dissolved completely. Where only part of the equivalent amount of hydrochloric acid has been added in the first instance, additional acid is added during the digestion at a rate substantially equivalent to that at which it is consumed by the exothermic chemical reactions occurring within the mixture. In this manner, the boiling point of the mixture may be maintained at a relatively high level, the increasing concentrations of dissolved salts formed as the reaction progresses compensating for the diluting action of the added acid. Hence it is possible accurately to control the reaction temperature by adjusting either or both of two operating variables, i. e. the rate of addition of the acid and the amount of heat supplied to the mixture. When digesting a titaniferous bauxite containing about 4% by weight titanium (as TiO2), it is easily possible in this manner to establish and maintain throughout the entire digestion period a digesting temperature of between 110–115° C.

In the event that the entire equivalent quantity of hydrochloric acid has been added to the digestion mixture at the commencement of the digestion period, the desired degree of temperature control may be obtained by regulating the heat supply only. Thus, when operating on a titaniferous magnetite containing 6–14% by weight TiO2 with concentrated hydrochloric acid having a specific gravity of 1.19, the temperature at which boiling first occurs may be as low as 75° C. However, as the reaction proceeds, the temperature rapidly rises owing to the accumulation of dissolved salts until it reaches a level of about 104° C.

In either case, owing to the high digesting temperatures, the reaction is very rapid and is complete within a period of from about two to about four hours, as evidenced by the continued presence of hydrochloric acid in the distillation column with which the reaction vessel is provided. As has been indicated above, this is very much less than the period of from two to three days required by the digesting procedures of the prior art, which may be attributable largely to the fact that at the elevated temperatures at which the reaction is carried on, there do not appear the gelations, impervious layers of titanium containing material which coat the mineral particles during digestion at lower temperatures.

At the end of the reaction period, the reaction mixture is cooled and the insoluble matter (tailings) separated. This will consist of any material originally present in the mineral which is insoluble in hydrochloric acid under the digesting conditions. It consists primarily of silica, together with relatively minor proportions of garnet, zircon, and other insoluble substances if such are present in the mineral. Because of the vigorous digesting conditions, it is substantially free from titanium so that complete recovery of the latter element is assured.

Separation of the tailings may be accomplished by allowing them to settle and siphoning or decanting the supernatant liquor. Alternatively, the entire reaction mixture may be passed through a suitable filter. After separation, the silica fraction thus obtained is washed, dried, and, if desired, run through a classifier in order to separate it into various grades of commercial silica.

The silica-free liquor containing titanium chloride, ferrous chloride, and aluminum chloride, next is processed for recovery and separation of its content of dissolved salts. This may be accomplished in various manners, one being illustrated in flow A of the drawing, adapted for the processing of a liquor containing titanium chloride and iron chloride, and another being outlined in flow B of the drawing and adapted for the processing of a liquor containing aluminum chloride in addition to titanium chloride and iron chloride.

In accordance with the process of flow A, cellulose is added to the silica-free liquor resulting from the digestion step and the resulting mixture is distilled at a temperature substantially above the digestion temperature, i. e. at a temperature of between 110° C. and 140° C., to remove hydrochloric acid and water and to convert the titanium chloride to the insoluble meta titanic acid. The distillation step, like the digestion operation, is carried out in the absence of air or free oxygen in order to maintain the iron content of the liquor in the form of ferrous chloride and thus prevent the formation of ferric iron-titanium containing compounds which would be isolated together with the meta titanic acid, thereby contaminating the latter with iron.

The purpose of distilling in the presence of cellulose is two-fold, as indicated above. The cellulose serves a mechanical function in that it helps maintain the meta titanic acid in suspension during the distillation and prevents its crystallization and consolidation upon the surfaces of the distillation vessel. If it occurs, such consolidation presents a distinct problem by preventing proper heat transfer so that blistering, cracking and blowing out of the distillation vessel may occur. The presence of the cellulose also makes the precipitated meta titanic acid more easily filtered and washed free of adhering chlorides.

Secondly the cellulose serves a chemical function since it is in part converted to sugars by the action of the aqueous hydrochloric acid solution. Since these are soluble in water, they subsequently separate together with the water-soluble iron chloride and serve as a reducing agent therefor as more particularly will be pointed out hereinafter.

The cellulosic material employed for the foregoing purposes may be derived from a variety of sources such as cotton, wood pulp, wood fiber, bagasse, corn stalks, straw, etc. If not substantially ash free, it preferably is subjected to a preliminary treatment designed to free it from its mineral content, which otherwise might contaminate the various products. It may be employed in variable quantities, but preferably is used in an amount equal to from one-half to one times the weight of the meta titanic acid in the mixture.

As the heating continues and the hydrochloric acid is removed, the titanium chloride is converted to meta titanic acid which is insoluble and precipitates. It is of the greatest importance to the commercial success of the process that this conversion be complete. If it is not, as much as 10% of the titanium remains in soluble form and separates together with the iron chloride. This results in loss of titanium and, more important still, in contamination of the iron with titanium.

I have discovered that precipitation of the meta titanic acid does not occur with the required degree of completeness until the distillation has been carried on to the point where substantially all of the water and hydrochloric acid have been removed from the material, as evidenced by the separation of a moist, crystalline mixture comprising meta titanic acid, ferrous chloride, cellulose and sugars, the latter having been formed by the action of the boiling hydrochloric acid on the cellulose during the distillation. In this mixture the titanium is present substantially quantitatively in the form of the highly insoluble meta titanic acid, which may be separated quantitatively from the water-soluble ferrous chloride by extraction with water.

The water extraction may be carried out in any suitable manner, either batchwise or continuously, using a sufficient amount of hot or cold water in a sufficient number of stages to dissolve completely the ferrous chloride as well as the water soluble sugars formed by the action of the hydrochloric acid on the cellulose during the distillation step. The aqueous hydrochloric acid having a concentration of about 8% recoverable as a product of the distillation step may advantageously be used as an extractant for this purpose, since it is an excellent solvent for ferrous chloride, but a non-solvent for meta titanic acid which, once formed, is very difficult to dissolve even in hydrochloric acid, the solvent from which it is completely precipitated with such difficulty. Furthermore, it acts to prevent the formation of a colloidal suspension of meta titanic acid which otherwise tends to form.

After separating by filtration, decantation, siphoning or otherwise the aqueous extract containing ferrous chloride and sugars from the insoluble residue comprising meta titanic acid and cellulose, the residue is washed, dried and calcined for about ½ hour at about 800° C. This converts the meta titanic acid to titanium dioxide, the desired end product. This is obtained in pure form, free from contamination with iron, and free from all cellulose, the latter having been burned off during the calcination. It is adaptable to any of its several commercial uses, as for example in pigmenting coating compositions.

The iron content of the aqueous extract resulting from the foregoing procedure is recovered by evaporating the extract to dryness and calcining at about 450–550° C. At this temperature the chlorine is driven off and recovered, while the sugar content of the mixture acts as a reducing agent, creating a reducing atmosphere in the calcining retort and thus forming metallic iron which is cooled in a non-oxidizing atmosphere. The iron thus obtained is in the powdered form, free from contamination by titanium, and commanding a premium as commercial powdered iron.

Considering next the application of the process of the invention to minerals containing aluminum in addition to titanium, iron and silica, as indicated in flow B of the drawing:

These minerals are given a preliminary treatment substantially as outlined above with reference to minerals not containing aluminum. Thus the raw mineral may be crushed, screened, concentrated, and otherwise suitably reduced to a form adapted for subsequent processing. It may then be digested in concentrated hydrochloric acid at the boiling point for two to four hours in the absence of free oxygen. As before, the hydrochloric acid may be added all at once at the beginning of the operation, or less than the theoretical quantity of hydrochloric acid may be added in the first instance, the remainder being added gradually during the digestion operation as required to maintain a digesting temperature of 100 to 115° C. without loss of hydrochloric acid (through volatilization). After the digestion is complete, the insoluble silica is separated by filtration, decantation or otherwise from the solution containing titanium chloride, ferrous chloride, and aluminum chloride.

The latter solution then is distilled as described in the discussion of flow A, the distillation being carried on in the absence of free oxygen until complete removal of all hydrochloric acid and quantitative precipitation of the metatitanic acid. This necessitates boiling down the solution at a temperature of from 110° to 140° C. until the solids content of the solution separates in the form of the moist, crystalline salts.

Cellulose may or may not be added during the distillation step of flow B as it was added during the corresponding step of flow A. When added, it serves the same useful purpose of preventing adherence of the precipitated meta titanic acid on the walls of the distillation vessel of facilitating its filtering and washing.

The moist salts remaining after completion of the distillation step comprise a mixture of meta titanic acid, ferrous chloride, and aluminum chloride. This mixture is extracted with water, hot or cold, or, preferably, dilute hydrochloric acid in batchwise or continuous operation, until the soluble ferrous chloride and aluminum chloride have been extracted from the highly insoluble meta titanic acid. The latter, which is completely free from iron, is dried and calcined at about 800° C. to form titanium dioxide.

The solution remaining after separation of the meta titanic acid and containing dissolved ferrous chloride and aluminum chloride is evaporated to dyness and calcined at a temperature of about 450–550° C. This drives off the chlorine (recovered) and converts the salt content of the mixture to ferrous oxide and aluminum hydrates, principally aluminum hydroxide $(Al(OH)_3)$. The calcined material then is treated with hot caustic solution containing from 20 to 40 parts sodium hydroxide per 100 parts solution to dissolve the aluminum hydrate and leave the iron oxide as an insoluble residue. The iron and the aluminum thus are separated, the latter being recoverable from the caustic solution by conventional processes such as the Bayer process.

The process of the invention is further illustrated by the following non-limiting examples, wherein parts are expressed as parts by weight.

*Example 1*

A titaniferous bauxite averaging about 4% titanium (as titanium dioxide) and containing in addition aluminum, iron, and silica was air dried and crushed to pass a ten to fifty mesh screen. The crushed ore was mixed with concentrated hydrochloric acid (sp. gr. 1.19) in the proportion of one part ore to five parts acid and the mixture immediately introduced into a digester equipped with a condenser. Heat was applied gradually to initiate the reaction, care being taken not to cause excessive volatilization of the hydrochloric acid. Only enough vapor was allowed to escape into the condenser to indicate maximum reaction.

As the chlorides formed in the solution, the increase of the salt content constantly raised the boiling point until after about ½ hour a temperature of 113° C. was reached. At this temperature, digestion proceeded rapidly without the loss of large volumes of hydrochloric acid gas and heat to the condenser. As the reaction was exothermic, comparatively little additional heat was required until near the conclusion of the reaction, when some heat was applied to obtain complete digestion of the ore.

After a total digestion period of about three hours, the charge was transferred from the digester to a settling tank and allowed to stand until the silica residue had settled to the bottom. The clear supernatant liquid then was siphoned off, and the residue washed with water in such a manner that the chlorides it contained were removed and returned as a concentrated solution to the solution siphoned from the top of the tank.

The latter solution, which contained the chlorides of titanium, iron and aluminum, was introduced into an evaporator where it was distilled in the absence of free oxygen, the temperature increasing during this step from 113° C. to 122° C. at which temperature insoluble meta titanic acid began to appear in the solution. The boiling was continued until substantially all of the hydrochloric acid was removed and crystals of ferrous chloride began to form. This required from thirty to forty minutes, at the termination of which period the temperature had increased to 132° C. The mixture then was cooled, whereupon the meta titanic acid, iron chloride, and aluminum chloride were deposited as a residue in the form of the moist crystalline salts.

The moist salts resulting from the distillation step were taken up in a sufficient quantity of the 8% aqueous hydrochloric acid obtained as a distillate from that step to redissolve the dissolvable chlorides. The insoluble meta titanic acid then was separated from the solution by filtration, and washed with 8% hydrochloric acid to remove any occluded chlorides, the washings being added to the solution. The washed meta titanic acid was calcined and thus converted to titanium dioxide, which was obtained in a yield of 94.5% of the theoretical.

The solution remaining after separation of the meta titanic acid was evaporated to dryness and calcined, the acid fumes formed being conducted to a condenser and recovered as hydrochloric acid for re-use in the extraction of further quantities of minerals. During the evaporation, the temperature was raised to 260° C., thereby removing the moisture and sufficient chlorine to convert the chlorides to a powder and render them no longer deliquescent, even though a little chlorine remained. They then were calcined in a continuously operating rotary furnace at a temperature not exceeding 470° C. at which temperature the hydrogen chloride was completely driven off, this acid also being recovered.

The calcining treatment converted the iron and aluminum content of the solution to ferrous oxide and hydrates of aluminum. These were treated with hot caustic solutions containing at least 20% sodium hydroxide thereby dissolving the aluminum hydrate. The insoluble iron oxide was separated from the solution, and washed. As thus obtained, it was of high purity and entirely free from titanium.

The caustic solution contained almost pure sodium aluminate, which could be used as a source of aluminum hydroxide, or converted to other aluminum compounds by known methods.

Example 2

Titaniferous magnetite containing 33–44% iron and 10–14% titanium dioxide with small quantities of garnet, zircon, silica, etc., was concentrated by gravity and ground to pass a 150 mesh screen. The ground material then was mixed with five parts concentrated hydrochloric acid having a specific gravity of 1.19 for each part of mineral.

The mixture of mineral and acid was placed in an air tight digester having a free space above the surface of the charge approximately equal to the volume of the charge, to allow room for any frothing that might occur during digestion. Heat then was applied sufficient to cause slight bubbling on its surface, but insufficient to cause loss of hydrogen chloride beyond that required to drive out air from the digester through the condenser. The mixture started to boil slightly at about 75° C., the boiling temperature rapidly rising to 104–105° C., where it was maintained for the duration of the digestion period (about three hours).

The digested mixture then was decanted into a vertical settling tank and permitted to settle, the residue being removed from the lower end of the tank and washed with water.

The remaining solution containing dissolved chlorides of iron and titanium then was filtered to remove the last traces of solids, mixed with cellulose in amount equal to 0.75 times the weight of meta titanic acid present, and distilled in the absence of air or free oxygen to remove all hydrochloric acid and precipitate the titanium as meta titanic acid. During the distillation, the meta titanic acid began to precipitate at about 112° C. At this point water free from air in amount equal to about ten times the weight of the meta titanic acid was added to the mixture in order to assist in the complete precipitation of the meta titanic acid.

The distillation operation was continued until the conversion of this titanium chloride to meta titanic acid was complete. The mixture then was cooled, and the resulting moist mixture of meta titanic acid, ferrous chloride, cellulose and cellulose-derived sugars extracted with 8% hydrochloric acid to separate the insoluble meta titanic acid and cellulose from the soluble ferrous chloride and sugars. The solid meta titanic acid-cellulose mixture was calcined at 800° C. to form iron-free titanium dioxide. The solution containing ferrous chloride and sugars was evaporated to dryness and calcined, yielding titanium-free powdered iron as a product.

The invention thus provides a rapid, practical, continuous process for opening up or decomposing stubborn titaniferous minerals in a matter of two to four hours rather than two to three days as has heretofore been required. It provides further a process for separating quantitatively the titanium and iron contents of such minerals so that each of these metals may be obtained in a pure state uncontaminated by the other. Furthermore, the process is economically attractive since the reagents employed are largely recoverable and all of the various constituents of the mineral, i. e. the titanium, iron, aluminum, and silica, are obtained in commercially usable forms.

Having now described my invention in preferred embodiments what I claim as new and desire to protect by Letters Patent is:

1. The process of opening up titaniferous minerals containing less than about 15% by weight titanium (expressed as $TiO_2$) which comprises digesting the mineral with concentrated hydrochloric acid in total amount at least equal to that theoretically required to react with the hydrochloric acid-reactive constituents thereof, at about the boiling point but below the precipitating temperature of meta titanic acid until the solution of the said constituents is substantially complete.

2. The process of opening up titaniferous bauxite ores containing from about 2% to about 5% by weight titanium (expressed as $TiO_2$) which comprises forming a slurry of the mineral with concentrated hydrochloric acid having a specific gravity of above about 1.18, the hydrochloric acid being used in less than the amount theoretically required to react with the mineral, raising the temperature of the resulting mixture to a boiling temperature of between about 110° C. and about 115° C., at normal atmospheric pressure and maintaining it at the boiling temperature for a digestion period of between about two hours and about four hours while adding further quantities of concentrated hydrochloric acid as required to meet the demands of the reaction.

3. The process of opening up a titaniferous ore containing from about 6% to about 14% by weight titanium dioxide which comprises admixing the mineral with hydrochloric acid having a specific gravity greater than about 1.14 in amount at least equal to that equivalent to the hydrochloric acid-reactive constituents of the mineral, heating the resulting mixture to a boiling temperature of between about 104° C. and about 110° C., and digesting the mixture at this boiling temperature for a period of from two to four hours.

4. The process of decomposing titaniferous iron minerals containing less than about 15% by weight titanium expressed as titanium dioxide which comprises mixing the mineral with concentrated hydrochloric acid in amount at least equivalent to the hydrochloric acid reactive constituents of the mineral, heating the resulting mixture in the absence of oxygen to its boiling temperature and digesting it at that temperature in the continued absence of oxygen, thereby converting the titanium and iron content of the mineral substantially completely to soluble titanium chloride and soluble ferrous chloride, respectively, and distilling the resulting solution containing titanium chloride and ferrous chloride in the substantial absence of oxygen, thereby converting the titanium chloride to insoluble meta titanic acid while preventing the formation of insoluble compounds containing iron and titanium and resultant contamination of the titanium product with iron.

5. The process of opening up silicious titanium ores containing less than about 15% by weight titanium (expressed as $TiO_2$) which comprises forming a mixture of the ore with concentrated hydrochloric acid in amount at least equal to the equivalent amount, digesting the resulting mixture at its boiling temperature but below the precipitation temperature of meta titanic acid, thereby converting the titanium content of the ore to soluble titanium chloride and leaving the silica as an insoluble residue, and separating the silica residue from the titanium chloride-containing solution.

6. The process of working titaniferous minerals containing silica and up to about 15% by weight titanium (as $TiO_2$) which comprises forming a slurry comprising the mineral and concentrated hydrochloric acid in less than the equivalent amount, digesting the slurry at a temperature above its boiling point while gradually adding further quantities of concentrated hydrochloric acid at a rate substantially equal to the rate of consumption thereof until the mineral decomposing reactions are substantially complete, thereby converting the titanium content of the mineral to soluble titanium chloride while leaving the silica as an insoluble residue, separating the titanium chloride-containing solution from the silica residue, and distilling the titanium chloride-containing solution to remove hydrochloric acid and to convert the titanium chloride to insoluble meta titanic acid.

7. The process of separating titanium from titaniferous minerals which comprises digesting the mineral with concentrated hydrochloric acid at about the boiling point, thereby converting the titanium content thereof to soluble titanium chloride, distilling the titanium chloride-containing solution to remove hydrochloric acid and form insoluble meta titanic acid, the distillation being continued to the point where the solid content of the solution separates as a moist, crystalline residue comprising insoluble meta titanic acid and soluble chlorides of other metals present in the minerals, and taking up the said moist, crystalline residue in water whereby to dissolve the soluble chlorides and effect their substantially quantitative separation from the remaining insoluble meta titanic acid.

8. The process of separating titanium from titaniferous ores containing not more than about 15% by weight titanium (as $TiO_2$) which comprises mixing the mineral with concentrated hydrochloric acid in amount at least equal to that theoretically required to react with the total hydrochloric acid reactive content of the mineral, digesting the mixture at its boiling temperature and in the substantial absence of oxygen until the titanium content of the mineral has been converted to soluble titanium chloride, distilling the resulting solution in the continued absence of oxygen to remove hydrochloric acid and raise the temperature of the solution to a meta titanic acid precipitating level, continuing the distillation to form a residue containing insoluble meta titanic acid and soluble chlorides of other metals originally present in the mineral, and treating the residue with water to dissolve the soluble chlorides, leaving unaffected the meta titanic acid as an insoluble residue.

9. The process of separating titanium from silica-containing titaniferous ores having a titanium content of less than about 15% by weight (expressed as $TiO_2$), which comprises forming a mixture of the mineral with an excess of concentrated hydrochloric acid, digesting the mixture at the boiling temperature, thereby converting the titanium content of the mineral to soluble titanium chloride while leaving the silica content thereof as an insoluble residue, separating the titanium solution from the silica-containing residue, and distilling the titanium chloride solution to remove hydrochloric acid therefrom and precipitate substantially completely its titanium content as insoluble meta titanic acid, the distillation being continued to the point where, the non-distillable fraction remains as a crystalline residue comprising insoluble meta titanic acid and soluble chlorides of metals other than titanium, treating the residue with water to dissolve the soluble chlorides, and separating the resulting solution of soluble chlorides from the insoluble residue comprising meta titanic acid, thereby effecting the substantially quantitative isolation of the titanium content of the mineral.

10. The process of separating titanium from titaniferous ores which comprises digesting the ore with concentrated hydrochloric acid at about the boiling point, thereby converting the titanium content thereof to soluble titanium chloride, adding cellulose to the titanium chloride solution, and distilling the resulting cellulose-containing mixture to remove hydrochloric acid and precipitate meta titanic acid, the meta titanic acid being deposited in admixture with the cellulose, thereby preventing the adherence of the meta titanic acid to the walls of the distillation vessel and facilitating correspondingly its subsequent processing.

11. The process of separating titanium from titaniferous bauxites containing less than about 15% by weight titanium (as $TiO_2$), which comprises forming a slurry of the mineral with concentrated hydrochloric acid in amount less than the equivalent amount, digesting the slurry at the boiling temperature while adding further quantities of hydrochloric acid at a rate not substantially exceeding that required to supply the demand for acid by the reactions occurring in the reaction mixture until substantially all of the titanium and other metal content of the mineral has been converted to soluble chlorides, adding cellulose to the resulting solution, distilling the resulting cellulose-containing mixture selectively to hydrolize the titanium chloride content thereof and form insoluble meta titanic acid, the meta titanic acid being deposited in admixture with the cellulose and thus preventing it from adhering to the walls of the still, extracting with water the residue remaining after the distillation, thereby dissolving the water soluble chlorides of the other metals originally present in the mineral, and separating the resulting solution from an insoluble residue comprising meta titanic acid and cellulose.

12. The process of opening up titaniferous minerals containing less than about 15% by weight titanium (expressed as $TiO_2$) which comprises digesting the mineral with concentrated hydrochloric acid in total amount at least equal to that theoretically required to react with the hydrochloric acid reactive constituents thereof at a temperature of between about 100° C. and about 115° C. until the solution of the constituents is substantially complete.

EDWIN G. JUDD.

REFERENCES CITED

The following references are of record in the file of this patent:

UNITED STATES PATENTS

| Number | Name | Date |
|---|---|---|
| 918,381 | Simpson et al. | Apr. 13, 1909 |
| 1,272,855 | Rossi | July 16, 1918 |
| 2,088,913 | Llewellyn | Aug. 3, 1937 |
| 2,130,228 | Clarke | Sept. 13, 1938 |
| 2,167,627 | Alessandroni | Aug. 1, 1939 |

FOREIGN PATENTS

| Number | Country | Date |
|---|---|---|
| 448,107 | Great Britain | May 25, 1936 |